United States Patent
Shahriar et al.

(10) Patent No.: US 10,505,840 B2
(45) Date of Patent: Dec. 10, 2019

(54) METHODS AND SYSTEMS FOR FAILURE RECOVERY IN A VIRTUAL NETWORK ENVIRONMENT

(71) Applicants: Nashid Shahriar, Waterloo (CA); Jeebak Mitra, Ottawa (CA); Reaz Ahmed, Waterloo (CA); Shihabur Rahman Chowdhury, Kitchener (CA); Raouf Boutaba, Waterloo (CA)

(72) Inventors: Nashid Shahriar, Waterloo (CA); Jeebak Mitra, Ottawa (CA); Reaz Ahmed, Waterloo (CA); Shihabur Rahman Chowdhury, Kitchener (CA); Raouf Boutaba, Waterloo (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 25 days.

(21) Appl. No.: 15/267,696

(22) Filed: Sep. 16, 2016

(65) Prior Publication Data

US 2017/0339049 A1   Nov. 23, 2017

Related U.S. Application Data

(60) Provisional application No. 62/337,511, filed on May 17, 2016.

(51) Int. Cl.
*H04L 12/28* (2006.01)
*H04L 12/703* (2013.01)
(Continued)

(52) U.S. Cl.
CPC .............. *H04L 45/28* (2013.01); *H04L 45/02* (2013.01); *H04L 45/124* (2013.01);
(Continued)

(58) Field of Classification Search
CPC ....... H04L 45/28; H04L 45/02; H04L 45/124; H04L 24/125; H04L 45/22; H04L 45/64
See application file for complete search history.

(56) References Cited

U.S. PATENT DOCUMENTS 6,735,631 B1 *   5/2004   Oehrke ................... H04L 41/12
                                                                709/201
7,428,209 B1 *   9/2008   Roberts ............... H04L 41/0668
                                                                370/217

(Continued)

OTHER PUBLICATIONS

Khan et al, SiMPLE: Survivability in Multipath Link Embedding, 11th International Conference on Network and Service Management (CNSM), Nov. 9-13, 2015, pp. 210-218, Waterloo, Canada.

(Continued)

*Primary Examiner* — Stephen M D Agosta

(57) ABSTRACT

A method for failure recovery in a virtual network environment including a virtual network having virtual nodes and virtual links mapped onto substrate nodes and substrate paths, respectively, of a substrate network, the method comprising, in response to an indication of failure of at least one substrate node in the substrate network: re-mapping a virtual node mapped to a failed substrate node to a selected substrate node other than the failed substrate node; and re-mapping a virtual link mapped to a substrate path that involves the failed substrate node to a substrate path that does not involve the failed substrate node; wherein the re-mapping is carried out to achieve at least one re-mapping objective.

19 Claims, 15 Drawing Sheets

(51) Int. Cl.
*H04L 12/751* (2013.01)
*H04L 12/721* (2013.01)
*H04L 12/729* (2013.01)
*H04L 12/707* (2013.01)
*H04L 12/715* (2013.01)

(52) U.S. Cl.
CPC ............ *H04L 45/125* (2013.01); *H04L 45/22* (2013.01); *H04L 45/64* (2013.01)

(56) References Cited

U.S. PATENT DOCUMENTS

| | | | | |
|---|---|---|---|---|
| 9,813,287 | B2* | 11/2017 | Ahmed | H04L 41/0668 |
| 2002/0067693 | A1* | 6/2002 | Kodialam | H04L 45/12 |
| | | | | 370/216 |
| 2005/0063299 | A1* | 3/2005 | Atkinson | H04J 14/0227 |
| | | | | 370/216 |
| 2006/0126502 | A1* | 6/2006 | Vasseur | H04L 45/04 |
| | | | | 370/221 |
| 2008/0002669 | A1* | 1/2008 | O'Brien | H04L 12/66 |
| | | | | 370/352 |
| 2011/0246647 | A1* | 10/2011 | Marquezan | H04L 43/00 |
| | | | | 709/224 |
| 2015/0278046 | A1* | 10/2015 | Zellermayer | G06F 11/1438 |
| | | | | 714/4.11 |
| 2017/0078152 | A1 | 3/2017 | Ahmed | |

OTHER PUBLICATIONS

Kurant, Maciej, et al., "Survivable Mapping Algorithm by Ring Trimming (SMART) for Large IP-over-WDM Networks," BROADNETS '04 Proceedings of the First International Conference on Broadband Networks, Oct. 2004, pp. 1-10., Washington, US.

Rahman, Muntasir Raihan, et al, "SVNE: Survivable Virtual Network Embedding Algorithms for Network Virtualization," IEEE Trans. VT, vol. 10, No. 2, Jun. 2013, pp. 105-118.

Soulalah, Oussama, et al, "A Batch Approach for a Survivable Virtual Network embedding based on Monte-Carlo Tree Search", IEEE International Symposium on Integrated Network Management, May 2015, pp. 1-8.

Even, S., et al., "On the Complexity of Timetable and Multi-Commodity Flow Problems", Foundations of Computer Science, 1975., 16th Annual Symposium on 5(4):184-193—Nov. 1975.

* cited by examiner

METHODS AND SYSTEMS FOR FAILURE RECOVERY IN A VIRTUAL NETWORK ENVIRONMENT

CROSS-REFERENCE TO RELATED APPLICATION

The present application claims the benefit under 35 U.S.C. 119(e) of U.S. Provisional Application Ser. No. 62/337,511, filed May 17, 2016, hereby incorporated by reference herein.

FIELD

The present invention relates generally to communication networks and, in particular, to failure recovery in virtual networks.

BACKGROUND

Network virtualization (NV) has evolved into a key enabling technology for offering next generation network services. Network virtualization requires efficient mapping of a virtual network (VN) to a substrate network (SN), which is also referred to as virtual network embedding (VNE).

Failure of network elements (both nodes and links) may occur at any time, yet many network operators have a desire for high availability networks. As deployments of network virtualization in production/commercial-grade networks using commodity hardware increase, failures in the underlying substrate network are even more common, and virtual network embedding has to tackle such failures to ensure virtual network survivability.

In the case of failures in the substrate network, one may end up with multiple virtual node and virtual link failures, affecting numerous virtual networks at a time. When re-embedding several virtual networks, the combinatorial possibilities available make the task of finding the most efficient mapping challenging. Clearly, therefore, providers of virtual networks would welcome more efficient and scalable re-mapping algorithms responsive to failures of, in particular, substrate nodes.

SUMMARY

According to a first aspect, the present invention seeks to provide a method for failure recovery in a virtual network environment including a virtual network having virtual nodes and virtual links mapped onto substrate nodes and substrate paths, respectively, of a substrate network. The method comprises: in response to an indication of failure of at least one substrate node in the substrate network: re-mapping a virtual node mapped to a failed substrate node to a selected substrate node other than the failed substrate node; and re-mapping a virtual link mapped to a substrate path that involves the failed substrate node to a substrate path that does not involve the failed substrate node; wherein the re-mapping is carried out to achieve at least one re-mapping objective.

According to a second aspect, the present invention seeks to provide a system for failure recovery in a virtual network environment including a virtual network having virtual nodes and virtual links mapped onto substrate nodes and substrate paths, respectively, of a substrate network. The system comprises: a processing unit for executing instructions; and a memory unit for storing instructions which, when executed by the processing unit, configure the system to respond to an indication of failure of at least one substrate node in the substrate network by: re-mapping a virtual node mapped to a failed substrate node to a selected substrate node other than the failed substrate node; and re-mapping a virtual link mapped to a substrate path that involves the failed substrate node to a substrate path that does not involve the failed substrate node; wherein the re-mapping is carried out to achieve at least one re-mapping objective.

According to a third aspect, the present invention seeks to provide a computer-readable storage medium comprising computer-readable instructions which, when executed by a processor, cause the processor to execute a method for failure recovery in a virtual network environment including a virtual network having virtual nodes and virtual links mapped onto substrate nodes and substrate paths, respectively, of a substrate network. The method comprises, in response to an indication of failure of at least one substrate node in the substrate network by re-mapping a virtual node mapped to a failed substrate node to a selected substrate node other than the failed substrate node; and re-mapping a virtual link mapped to a substrate path that involves the failed substrate node to a substrate path that does not involve the failed substrate node; wherein the re-mapping is carried out to achieve at least one re-mapping objective.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings.

DESCRIPTION OF EMBODIMENTS

Figure 1:
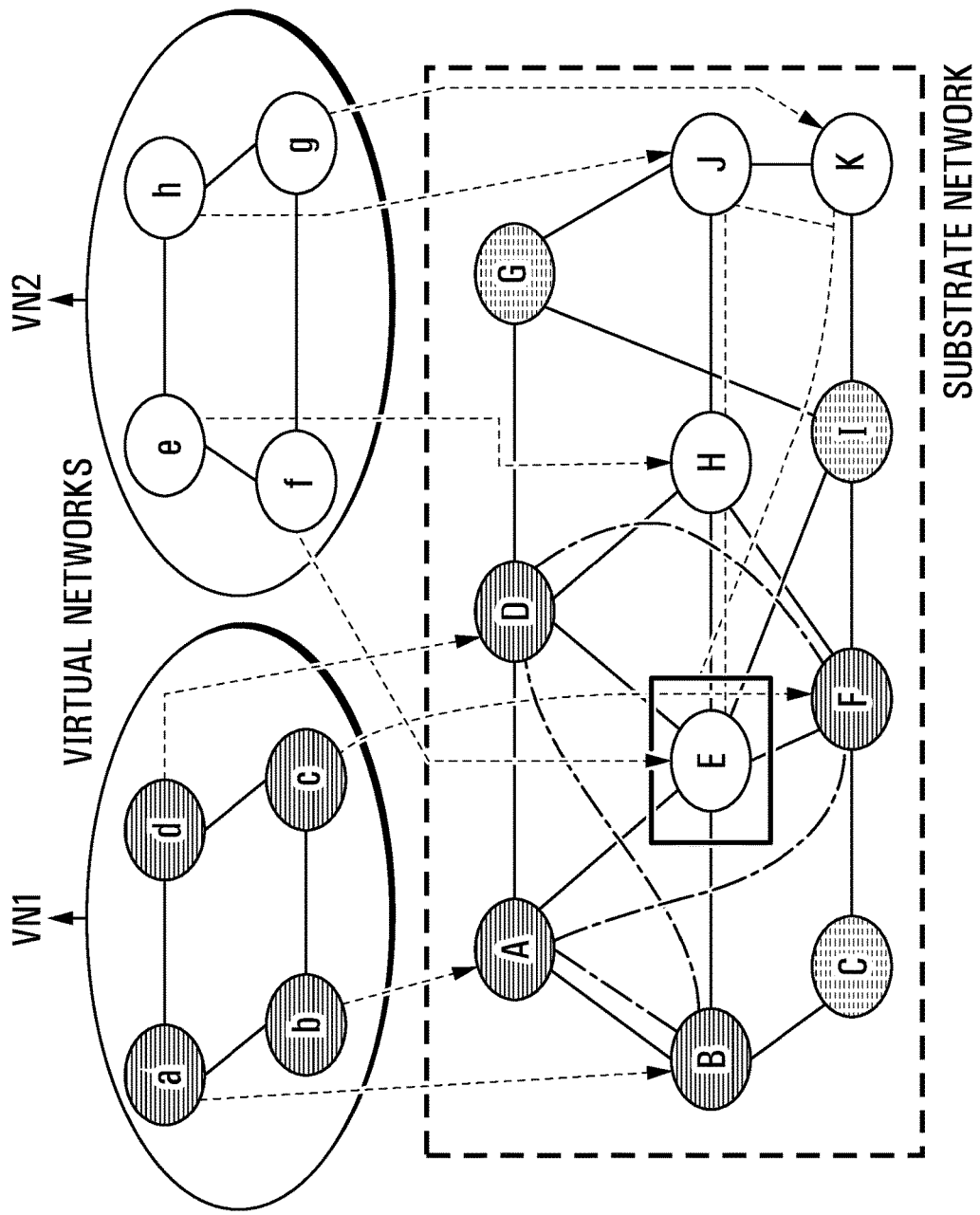
FIG. 1 is a schematic diagram of a substrate network including a plurality of substrate nodes, and two virtual networks mapped to the substrate network.

Reference is made to FIG. 1, depicting a physical (or substrate) network (denoted SN) including a plurality of physical (or substrate) nodes represented by uppercase letters A, B, C, D, E, F, G, H, I, J, K. The substrate nodes are interconnected by physical (or substrate) links. The substrate network may be represented as an undirected graph G=(V; E), where V and E are the set of substrate nodes and substrate links, respectively. Examples of substrate nodes include switches and servers in a telecommunications network. Examples of substrate links can include wired, radio frequency or optical communication channels or a combination thereof.

One or more "virtual networks" are mapped to (or "embedded in") the substrate network. The substrate network may be managed by an infrastructure provider, and the virtual network may be established by the infrastructure provider on behalf of a service provider. A virtual network includes a plurality of virtual nodes interconnected by virtual links. A "mapping" of the virtual network to the substrate network may consist of an association between virtual nodes and substrate nodes, respectively, as well as between virtual links and substrate paths, respectively. A substrate path may be as simple as a single substrate link in the substrate network or it may involve multiple substrate links passing through one or more intermediate substrate nodes.

Figure 3:
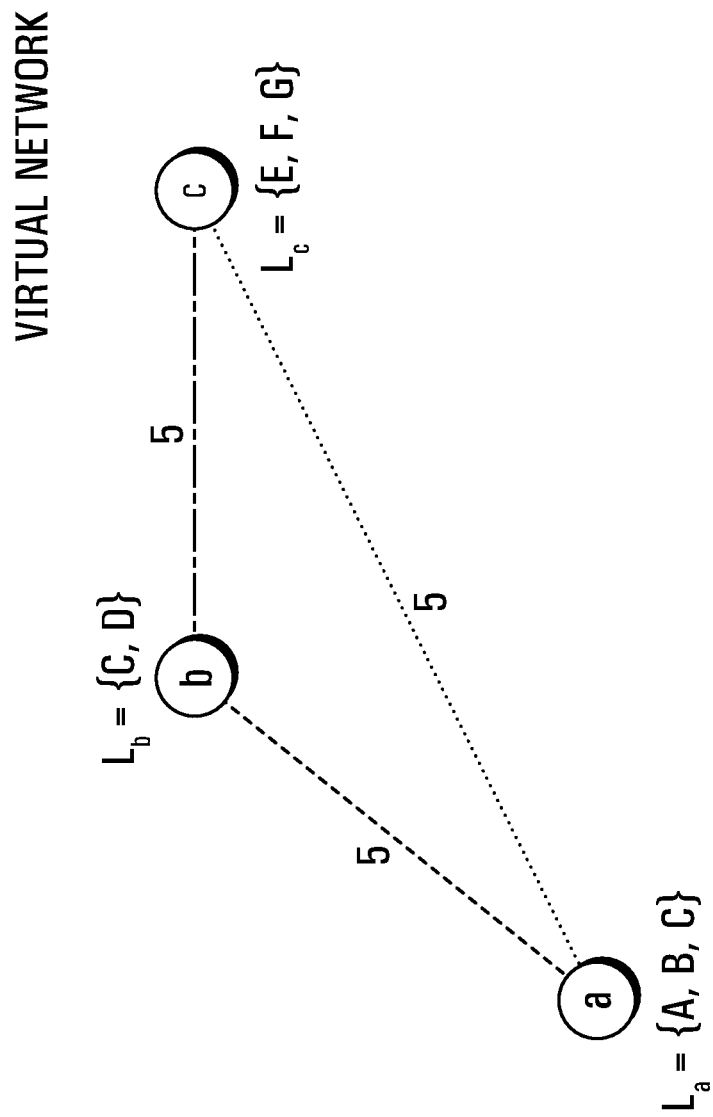
FIG. 3 illustrates the notion of a location constraint for a virtual node.

Each virtual link (denoted (u';v')) may have a bandwidth requirement (denoted ($b_{u',v'}$)), namely an amount of bandwidth that the virtual link needs or is expected to consume, and each virtual node (denoted u') may have a location constraint (denoted L(u')), namely a set of one or more substrate nodes that the virtual node is allowed to be mapped to. For example, with reference to FIG. 3, location constraint $L_a$={A, B, C} signifies that virtual node a can be mapped to any of substrate nodes A, B or C, location constraint $L_b$={C, D} signifies that virtual node b can be mapped to any of substrate nodes C or D and location constraint $L_c$={E, F, G} signifies that virtual node c can be mapped to any of substrate nodes E, F or G. The bandwidth requirements and the location constraints may be set or defined by an operator of the virtual network and/or the substrate network (e.g., the infrastructure provider or the service provider). The bandwidth requirements and the location constraints may be fixed or they may be changeable and indeed they may vary dynamically in response to various parameters. Together, the topology, requirements and constraints of the virtual network embedded onto the substrate network may be referred to as the virtual network "description" or "definition".

The mapping of the virtual network to the substrate network (i.e., the association between virtual nodes and substrate nodes, respectively, as well as between virtual links and substrate paths, respectively) is carried out by a processor executing an "embedding function", based on a variety of constraints (which are mandatory, such as the aforementioned bandwidth requirements and location constraints, as well as a variety of objectives (which are "best effort", examples of which will be provided later). A virtual network request received from the service provider or an external entity may initiate the embedding function. The mapping may change as network conditions change, in particular when failures are detected or when an indication of a failure is received, as will be described later on. The processor that executes the embedding function may thus be part of a system that is operated by the service provider and/or the infrastructure provider, depending on operational considerations.

Figure 4:
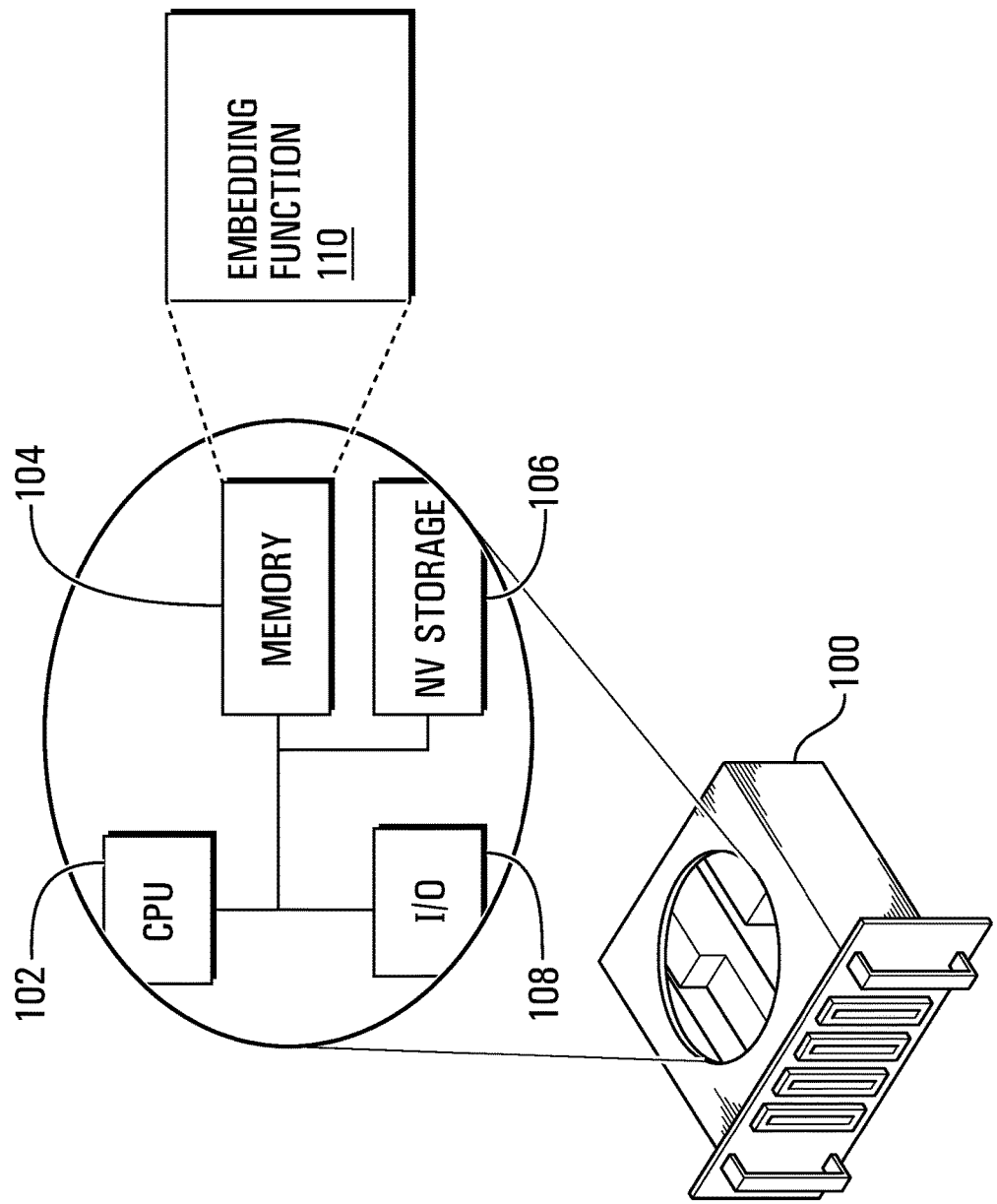
FIG. 4 depicts components of a system of the type that may perform an embedding function to re-map failed virtual nodes and failed virtual links to the substrate network.

FIG. 4 depicts components of a system of the type that may perform the embedding function referred to above. The system may reside in any one of the substrate nodes or in an external entity such as a Network Operation Center (NOC), for example. The system may comprise one or more computing devices. These are represented in FIG. 4 as a single server 100, but it should be understood that the system may be implemented as one or more real or virtual servers. Regardless of the particular implementation, the server 100 includes a processing unit 102 for executing instructions, and a memory 104 for storing instructions as well as data. The server 100 may further comprise non-volatile storage 106 for providing storage of both instructions and data for long periods of time. The data may include the definition of one or more virtual networks, including an initial mapping of each virtual network to the substrate network, an indication of the various bandwidth requirements and location constraints, as well as the re-mapping of virtual networks to the substrate network in response to a failure, as described in further detail herein below.

Further, the server 100 may include one or more input/output (I/O) interfaces or devices 108 that allow the server 100 to interact with users and/or other systems, including for the purposes of receiving virtual network requests. For example, the I/O interfaces or devices 108 may include keyboards, mice, monitors, network interfaces, etc. The instructions stored in the memory 104 may configure the server 100 to implement the aforementioned embedding function 110. Broadly, the embedding function 110 may include being attentive to receipt of an indication of a failure in the substrate network. Such failures may affect one or more substrate nodes and may also involve one or more substrate links. They may be detected by a variety of network components in a variety of ways, or they may be detected by the system itself. The embedding function 110 may thus include a response to receipt of the indication of the failure in the form of changing the mapping. By way of non-limiting example, in the case where the failure involves a failed substrate node, changing the mapping may involve re-mapping a virtual link that had been mapped to a substrate path that involves the failed substrate node to a substrate path that does not involve the failed substrate node.

In the illustrated embodiment of FIG. 1, which is only an example scenario, two virtual networks (denoted VN1 and VN2) are embedded in the same substrate network. It can be assumed that during a preliminary phase, two virtual network requests were received by the system, which would have executed two instances of the embedding function, leading to the mappings shown. In particular, it is seen that virtual network VN1 includes a plurality of virtual nodes (represented by lowercase letters a, b, c, d) and virtual network VN2 includes a plurality of virtual nodes (represented by lowercase letters e, f, g, h). Each virtual network (VN) may be represented as an undirected graph G'=(V'; E'), where V' and E' are the set of virtual nodes and virtual links, respectively. In this embodiment, virtual nodes a, b, c, d of VN1 are mapped to substrate nodes B, A, F, D, respectively and virtual nodes e, f, g, h of VN2 are mapped to substrate nodes H, E, K, J, respectively. The following mapping between virtual links and substrate paths is also in effect: I(a;b)→I(B;A), I(a;d)→{I(B;E); I(E;D)}, I(b;c)→{I(A;E);

I(E;F)}, I(c;d)→{I(F;H); I(H;D)}, I(e;f)→I(H;E), I(f; g)}→I(E;I), I(I;K), I(g;h)→I(K;J), I(h;e)→I(J;H).

Each substrate link I(U;V) may have the attributes of bandwidth capacity (denoted $b_{UV}$) and cost of allocating unit bandwidth on I(U;V) for provisioning a virtual link (denoted $C_{UV}$). Each substrate link I(U;V) may further have the attribute of "residual bandwidth" (denoted $r_{UV}$), which is the bandwidth capacity of the substrate link I(U;V) remaining after the one or more virtual networks (in this case, VN1 and VN2) have been mapped to the substrate network. In the architecture of FIG. 1, each of the substrate links has an associated bandwidth capacity, which may differ from link to link. Also in the architecture of FIG. 1, and in addition to the bandwidth capacity, each of the substrate links also has an associated cost for provisioning/carrying a unit of bandwidth.

A failure in the substrate network has consequences on the virtual networks mapped thereto. In particular, in the case of a failed substrate node, this will result in failure of any virtual node(s) mapped to the failed substrate node, hereinafter referred to as "failed virtual nodes". Also, any virtual links that are mapped to a substrate path that involves the failed substrate node will be considered as having failed. However, there is a distinction between virtual links that are adjacent to a failed virtual node (referred to as failed "adjacent virtual links") and virtual links that have failed but are not adjacent to a failed virtual node, that is to say, the failed substrate link does not have this type of virtual node mapped to it, but rather the failed substrate link (which may have failed for various reasons such as due to a fiber cut, etc.) is an intermediate substrate path to which is mapped a virtual link now considered to have failed. The latter type of virtual link, when failed, is referred to as a failed "independent virtual link".

Figure 2:
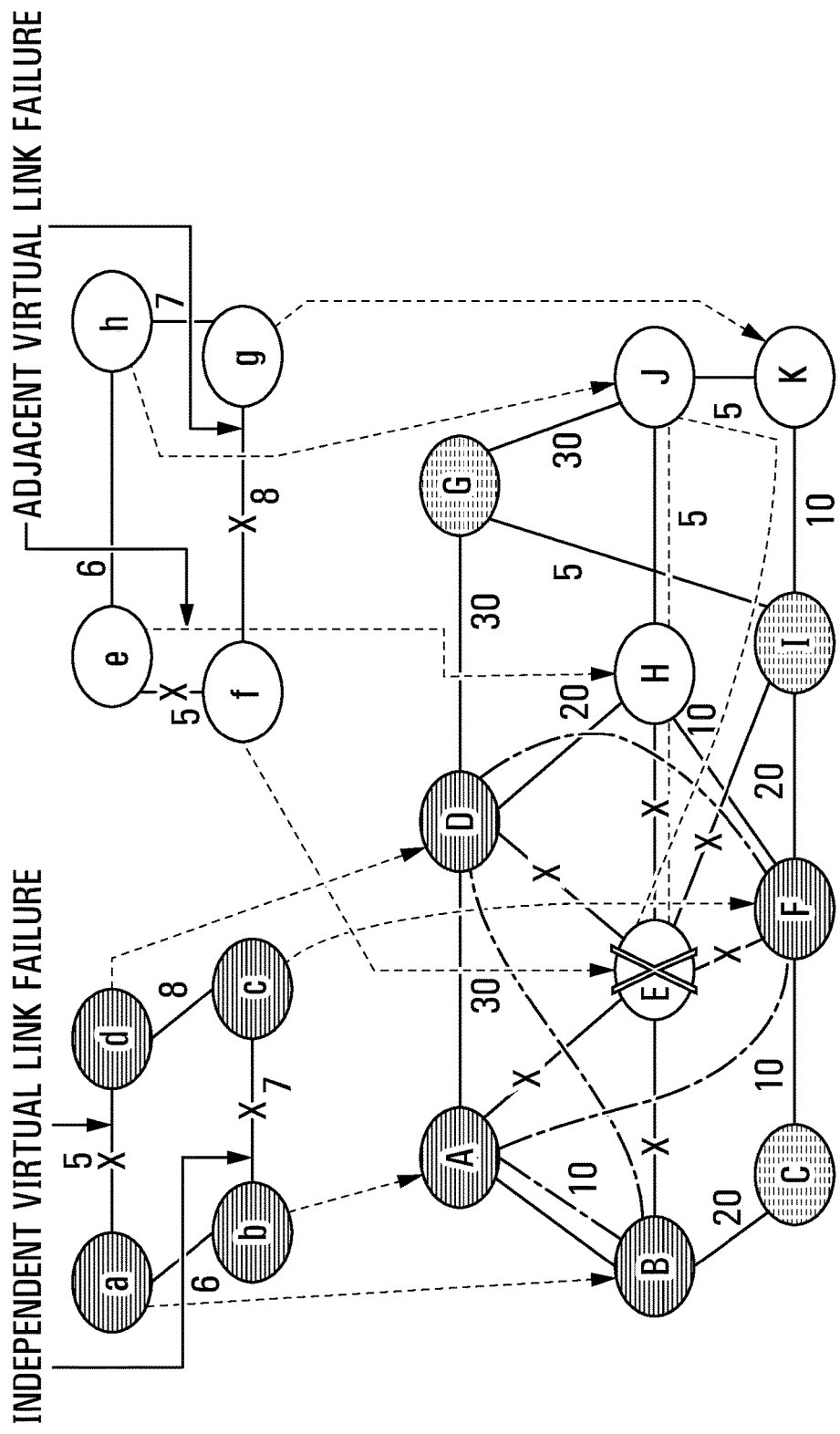
FIG. 2 shows the substrate network of FIG. 1 in which a particular one of the substrate nodes has failed.

An example of occurrence of a failure in the substrate network will now be discussed with reference to FIG. 2. The network architecture shown in FIG. 2 is identical to that of FIG. 1 except that there is now a failure of substrate node E. Also, the numbers that appear next to the various substrate links indicate the residual bandwidth of the respective substrate link, while the numbers that appear next to the various virtual links indicate the bandwidth requirement of the respective virtual link. Failure of substrate node E or any other substrate node or link may be detected by any suitable health monitoring mechanism in the substrate network. An indication of the failure is provided to the system of FIG. 4, which triggers the embedding function 110 to cause re-embedding (also known as re-mapping) of both virtual networks VN1 and VN2.

In particular, looking at VN2, at the time of the failure, virtual node f was mapped to failed substrate node E, which means that virtual node f is now a failed virtual node. Virtual links (e, f) and (f, g) in VN2 are directly connected to failed virtual node f and therefore are also failed adjacent virtual links. Further, as regards VN1, none of the virtual nodes was mapped to failed substrate node E. As such, there are no adjacent failed virtual links in VN1. However, it is noted that virtual link (a, d) had been mapped to substrate path B-E-D which involves failed substrate node E, with the implication that virtual link (a, d) is now an independent failed virtual link. The same reasoning applies to virtual link (b, c), which is now also an independent failed virtual link. In conclusion, however, both VN1 and VN2 will have virtual links that need re-embedding (re-mapping).

In addition to the failed substrate node E, there may be other failed links and/or nodes in the substrate network. Overall, this may be referred to as a failure set, i.e., a set of failed substrate links and substrate nodes. Given the existing embedding information that maps the virtual networks onto the substrate network, and given an indication of the failure set, embodiments of the embedding function 110 may re-embed/migrate/re-map the failed virtual networks. There are multiple ways in which to carry out the embedding function 110 to achieve this result. One such way is to subject the embedding function to certain mandatory constraints and certain best effort objectives, i.e., the re-mapping is carried out to achieve at least one re-mapping objective.

For example, mandatory constraints may refer to constraints that express certain basic and unwavering requirements of the virtual network that should be satisfied, otherwise there may be an error condition. In a specific non-limiting embodiment, an example of a mandatory constraint may include the requirement that failed virtual nodes be re-mapped to substrate nodes other than a failed substrate node. Another example of a mandatory constraint may include the requirement that failed virtual links be re-mapped to alternate substrate paths that do not involve failed substrate paths or failed substrate nodes. In contrast, best effort objectives guide execution of the embedding function towards a desired re-mapping behavior, but if they are expressed as conditions and these conditions are ultimately are not met, this would not be fatal to execution of the embedding function, nor would it be perceived as an error. For example, one of the best effort objectives of the embedding function may be to restore as many virtual networks as possible. Another best effort objective may be to provide recovery (i.e., completed re-mapping) within 50 ms of algorithm running time for a particular virtual network or all virtual networks.

Other examples of mandatory constraints include the location constraints for individual virtual nodes. Another example of a mandatory constraint is that a virtual node that is un-mapped from a failed substrate node is to be re-mapped to no more than one other substrate node (i.e., no splitting). Yet another example of a mandatory constraint is that no two virtual nodes from the same virtual network can be re-mapped to the same substrate node. A further example of a mandatory constraint is that when a particular virtual link is re-mapped to a particular substrate path, the particular substrate path should satisfy the bandwidth requirement of the particular virtual link, i.e., the particular substrate path should have sufficient residual bandwidth to accommodate the particular virtual link.

Other examples of best effort objectives include maximizing the total number of virtual links that are re-embedded. If that yields a "tie" between two or more possible re-mappings, then a further best effort objective could be applied, e.g., minimization of the total cost of the re-mapping. The total cost of the re-mapping may be computed as follows. Consider that each substrate link $L_i$ is associated with a cost $C\_L_i$ of allocating, on that substrate link, a unit bandwidth for a virtual link. The cost C of embedding a virtual link (u'; v') with a particular bandwidth requirement $b_{u'v'}$ on a particular substrate path L={L1, L2, ..., LN} is therefore simply expressed as the sum, across all given substrate links {L1, L2, ..., LN} forming part of the particular substrate path L, of the product of the particular bandwidth requirement and the aforementioned cost of allocating, on the given substrate link, a unit bandwidth for a virtual link:

$$C = b_{u'v'} * \Sigma_{i=1\ldots N}(L_i * C_{L_i}).$$

In an embodiment, the substrate paths are associated with corresponding customers, and the cost of allocating (or re-allocating) bandwidth to an individual one of the substrate paths may be weighted by a factor that depends on the customer associated with that individual one of the substrate paths. In order to arrive at a re-mapping that satisfies a given set of mandatory constraints while attempting to satisfy a set of best effort objectives, the embedding function may implement a variety of algorithmic solutions, including but not limited to the following:

Solution 1: Integer Linear Programming (ILP) Formulation.
Solution 2: Heuristic re-embedding.

Each of the above solutions is now described in further detail.

Solution 1: Integer Linear Programming (ILP) Formulation

The ILP-based optimization model has an objective to re-embed a maximum number of virtual links, and if this number is less than the total number of failed virtual links, the algorithm will terminate. As such, less than all virtual links may be re-embedded, which may occur due to resource limitations in the substrate network, for example. Implementation of the ILP formulation solution may be possible using computational tools such as IBM's ILOG CPLEX Library.

The Integer Linear Programming (ILP) formulation for the failure recovery problem is presented in three sections: decision variables, constraints and objective function.

A. Decision Variables

One represents the input virtual node and virtual link embedding of a virtual network in the set of virtual networks ($\overline{G}_i \in \overline{G}$) on a substrate network G with the following binary variables, respectively:

$$y_{i\overline{u}u} = \begin{cases} 1 & \text{iff } \overline{u} \in \overline{V}_i \text{ is mapped to } u \in V, \\ 0 & \text{otherwise} \end{cases}$$

$$x_{uv}^{\overline{u}\,\overline{v}} = \begin{cases} 1 & \text{iff } (\overline{u}, \overline{v}) \in \overline{E}_i \text{ is mapped to } (u, v) \in E, \\ 0 & \text{otherwise} \end{cases}$$

The objective of this ILP is to re-embed as many virtual links as possible in the set of failed virtual links ($\overline{E}^f$) to recover from the failure. It may be that not all failed virtual links in $\overline{E}^f$ can be re-embedded due to substrate resource constraints. Hence, one may introduce the following decision variable to define which virtual links are to be re-embedded:

$$z^{\overline{u}\,\overline{v}} = \begin{cases} 1 & \text{iff } (\overline{u}, \overline{v}) \in \overline{E}_i^f \text{ is mapped to any substrate path} \\ 0 & \text{otherwise} \end{cases}$$

B. Constraints

Firstly, the mapping of virtual nodes and virtual links that are not affected by the substrate failure remains unchanged. Constraints (1) and (2) below ensure that unaffected virtual nodes and virtual links are left unchanged:

$$\forall \overline{G}_i \in \overline{G}, \forall \overline{u} \in \overline{V}_i \setminus \overline{V}_i^f : y_{i\overline{u}f(\overline{u})}=1 \quad \text{Constraint 1}$$

$$\forall \overline{G}_i \in \overline{G}, \forall (\overline{u},\overline{v}) \in \overline{E}_i \setminus \overline{E}_i^f, \forall (u,v) \in g\overline{uv}: x_{uv}^{\overline{u}\,\overline{v}}=1 \quad \text{Constraint 2}$$

Secondly, the failed virtual nodes or virtual links cannot use any of the failed substrate nodes or substrate links for the purposes of re-embedding. Constraint (3) below ensures that the failed virtual nodes are not re-embedded on failed substrate nodes, and constraint (4) below ensures that the failed virtual links are not re-embedded on substrate paths containing any failed substrate link:

$$\forall \overline{G}_i \in \overline{G}, \forall \overline{u} \in \overline{V}_i^f, \forall u V_f : y_{i\overline{u}u}=0 \quad \text{Constraint 3}$$

$$\forall \overline{G}_i \in \overline{G}, \forall (\overline{u},\overline{v}) \in \overline{E}_i^f, \forall (u,v) \in E_f : x_{uv}^{\overline{u}\,\overline{v}}=0 \quad \text{Constraint 4}$$

Moreover, constraint (5) below prevents any over-commit of the bandwidth available on the substrate link. Second, constraint (6) below makes sure that the in-flow and out-flow of each substrate node is equal except at the substrate nodes where the endpoints of a failed virtual link are remapped. Finally, constraint (7) ensures that if a virtual link ($\overline{u}, \overline{v}$) is selected to be re-embedded due to the failure of virtual node $\overline{u}$, there is some flow from the substrate node u to which virtual node $\overline{v}$ is already embedded.

$$\forall (u,v) \in E: \Sigma_{\forall \overline{G}_i \in \overline{G}} \Sigma_{(\overline{u},\overline{v}) \in \overline{E}_i} x_{uv}^{\overline{u},\overline{v}} \times b_{\overline{u},\overline{v}} \leq b_{uv} \quad \text{Constraint 5}$$

$$\forall \overline{G}_i \in \overline{G}, \forall (\overline{u},\overline{v}) \in \overline{E}_i^f, \text{ s.t. } \overline{u} \in \overline{V}_i^f, \forall u \in V \setminus f(\overline{v}): \Sigma_{\forall v \in N(u)}(x_{uv}^{\overline{u}\overline{v}} - x_{vu}^{\overline{u}\overline{v}}) = y_{i\overline{u}u} - y_{i\overline{v}u} \quad \text{Constraint 6}$$

$$\forall \overline{G}_i \in \overline{G}, \forall (\overline{u},\overline{v}) \in \overline{E}_i^f, \text{ s.t. } \overline{u} \in \overline{V}_i^f, \forall u \in f(\overline{v}): \Sigma_{\forall v \in N(u)}(x_{uv}^{\overline{u}\overline{v}} - x_{vu}^{\overline{u}\overline{v}}) = z^{\overline{u}\overline{v}} \quad \text{Constraint 7}$$

Additionally, node mapping constraints are provided. First, constraint (8) below ensures that remapping of a failed virtual node should be done according to the location constraint as provided in the input. Second, constraint (9) below makes sure that a virtual node should be provisioned at exactly one node in the substrate network. Third, constraint (10) below enforces that a substrate node will not host more than one virtual node from the same virtual network. Finally, constraint (11) below ensures that if a virtual link ($\overline{u}, \overline{v}$) is selected to be re-embedded due to the failure of virtual node $\overline{u}$, then virtual node $\overline{u}$ must be re-embedded to any substrate node (except, of course, for a failed substrate node). Here, λ is selected to be a large integer that turns the left side of the equation of constraint (11) into a fraction between 0 and 1 when any of the $z^{\overline{u}\overline{v}}$ is 1. This forces the right side of the equation of constraint (11) to become 1, thus ensuring re-mapping of the failed virtual node.

$$\forall \overline{G}_i \in \overline{G}, \forall \overline{u} \in \overline{V}_i^f, \forall u \in V: y_{i\overline{u}u} \leq l_{\overline{u}u} \quad \text{Constraint 8}$$

$$\forall \overline{G}_i \in \overline{G}, \forall \overline{u} \in \overline{V}_i^f : \Sigma_{u \in V} y_{i\overline{u}u} \leq 1 \quad \text{Constraint 9}$$

$$\forall \overline{G}_i \in \overline{G}, \forall u \in V, \forall u V_f : \Sigma_{\overline{u} \in \overline{V}_i^f} y_{i\overline{u}u} = 0 \quad \text{Constraint 10}$$

$$\forall \overline{G}_i \in \overline{G}, \forall \overline{u} \in \overline{V}_i^f : \frac{1}{\lambda} \sum_{\overline{v} \in N(\overline{u})} z^{\overline{u}\overline{v}} \leq \sum_{\forall u \in V} y_{i\overline{u}u}$$

C. Objective Function

Following the problem statement, the objective function below has two components. The first component maximizes the number of re-embedded failed virtual links. The second one minimizes the total cost of provisioning bandwidth for re-embedding the failed virtual links on substrate paths. However, a weight factor w multiplies the second component to impose the necessary priority to the components of the objective function. The value of w is chosen to be a small fraction so that it comes into effect only to break the tie among multiple solutions that have the same value for the primary objective. In this way, w prioritizes the number of recovered virtual links over the cost of re-embedding.

Objective Function:

$$\text{minimize}\left(|\overline{E}^f| - \sum_{\forall \overline{G}_i \in \overline{G}} \sum_{(\overline{u},\overline{v}) \in \overline{E}_i^f} z^{\overline{u}\,\overline{v}}\right) +$$

-continued $$w\left(\sum_{\forall \overline{G_i} \in \overline{G}} \sum_{(\overline{u},\overline{v}) \in \overline{E}_i^f} \sum_{\forall (u,v) \in E} x_{uv}^{\overline{u}\overline{v}} \times C_{uv} \times b_{\overline{u}\overline{v}}\right)$$

While optimal, the ILP formulation solution may become computationally complex when scaling to large virtual network topologies. As such, one may turn to heuristic solutions.

Solution 2: Heuristic re-embedding

Figure 14:
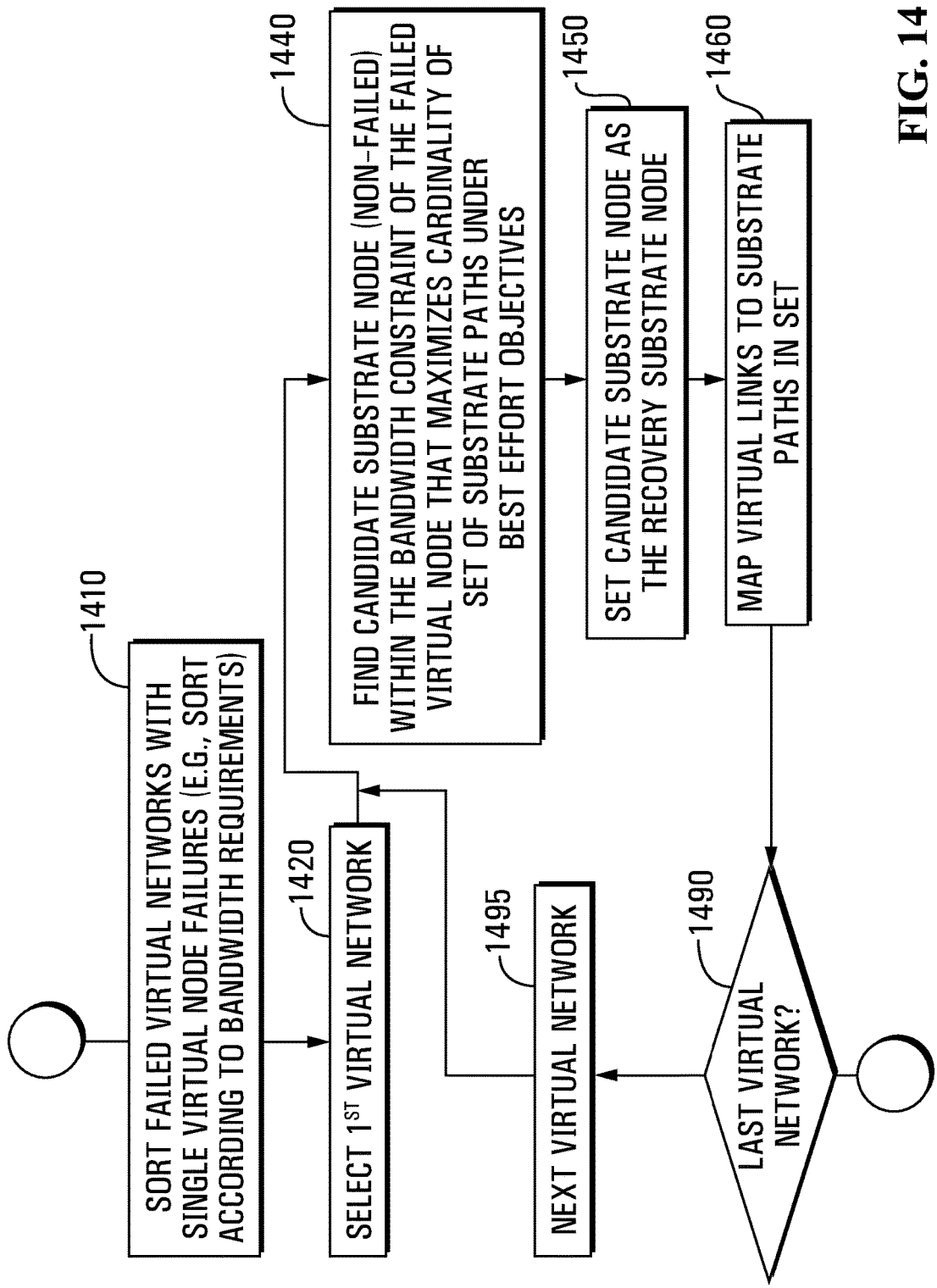
FIG. 14 is a flowchart illustrating a sequence of steps in an example non-limiting embodiment of an embedding function.

Solution 2 permits the recovery of a failed virtual node and its adjacent virtual links (i.e., failed adjacent virtual links) as a result of failure of a substrate node. The heuristic re-embedding solution is now described with reference to FIG. 14, which is a flowchart representing an example embedding function that can be implemented by a processor of, say, a network operations center, for re-embedding virtual networks having a single failed virtual node (multiple failed virtual nodes are described later on with reference to FIG. 15). The embedding function may include a preliminary step 1410 of sorting the failed virtual networks, i.e., the virtual networks affected by the substrate node failure, that is to say, the virtual networks containing a failed virtual node. The sorting may be carried out based on the total lost bandwidth in the adjacent virtual links of each failed virtual network, in increasing order. This results in a list which begins with the failed virtual network having a failed virtual node and for which the adjacent virtual links have the lowest bandwidth requirements and ends with failed virtual network having a failed virtual node and for which the adjacent virtual links have the highest bandwidth requirements.

The embedding function then proceeds to re-map the failed virtual networks, in the order that they were sorted at step 1410. The embedding function may then proceed to step 1420, whereby the first virtual network is selected according to the order outlined in step 1410. By proceeding in accordance with the order outlined in step 1410, the number of re-mapped failed virtual links will increase, which increases the overall probability of a failed virtual link being re-mapped.

The embedding function then proceeds to (i) change the substrate node to which the failed virtual node is mapped to, such that the particular failed virtual node is mapped to a new substrate node (the "recovery substrate node"); and (ii) change the substrate path to which the failed virtual links adjacent to the failed virtual node are mapped, such that the failed virtual links are mapped to different substrate paths (namely substrate paths including substrate links that involve the recovery substrate node).

Re-mapping of the failed virtual node and the failed adjacent virtual links can be done in a variety of ways. In the present embodiment, at step 1440, the embedding function proceeds over all candidate substrate nodes that are not failed to find the candidate node for which the set of substrate paths for the failed adjacent virtual links has maximum cardinality. (i.e., that allows the maximum number of failed adjacent virtual links to be remapped to substrate paths passing through that candidate substrate node).

In its quest to re-map failed adjacent virtual links to substrate paths, it is recalled that the embedding function is required to abide by a set of mandatory constraints while also aiming to satisfy a set of best effort objectives as described earlier. For example, for a particular failed virtual node, the embedding function proceeds to hypothetically re-map the particular failed virtual node to a first one of the substrate nodes specified by the location constraint (which is a mandatory constraint). With this in place, the embedding function determines a mapping of failed virtual links to substrate paths with the aim of satisfying additional mandatory constraints (e.g., bandwidth requirements). This is done iteratively for the various other (non-failed) substrate nodes specified by the location constraint. Two possibilities may arise:

(a) Maximum cardinality of the set of substrate paths is achieved for a single candidate substrate node. This candidate substrate node is selected as the substrate node to which the failed virtual node will be mapped (see step 1450).

(b) Maximum cardinality of the set of substrate paths is achieved for two or more candidate substrate nodes. In this case, the one that best satisfies the best effort objective is the "winner", i.e., is selected as the substrate node to which the failed virtual node will be mapped (see step 1450).

It should be noted that the cardinality of the set of substrate paths may be equal to the number of failed adjacent virtual links, i.e., each failed adjacent virtual link can be re-mapped to a substrate path. However, it is also possible that the set of substrate paths may be less than the number of failed adjacent virtual links. In other words, it is possible that no substrate path is found for some failed adjacent virtual links due to a resource shortage or other mandatory constraint not being satisfied and hence the cardinality of the set of substrate paths for the failed adjacent virtual links may be less than the number of adjacent failed virtual links. In this situation, it is possible to program the embedding function to abandon the re-mapping for the given failed virtual network.

At step 1450, the "recovery substrate node" is selected to be the winning candidate substrate node identified at step 1440, and at step 1460, the associated re-mapping of failed virtual links to substrate paths, associated with the recovery substrate node, is implemented.

At steps 1490 and 1495, the embedding function may proceed with the next failed virtual network. It should be noted that if there are no more failed virtual networks to consider, and not all failed virtual networks have been re-mapped, then this would imply that only a partial, as opposed to complete, recovery has taken place. This may be considered an acceptable result for the purposes of the present embodiment. That is to say, the algorithm of the embedding function will not necessarily continually reiterate until a complete re-mapping of all virtual networks occurs, but rather may produce an accelerated outcome if a partial recovery is considered an acceptable condition for stopping the embedding function. This will allow convergence to a feasible re-mapping even where there may be a lack of availability of alternative non-failed links with sufficient residual bandwidth.

Figure 15:
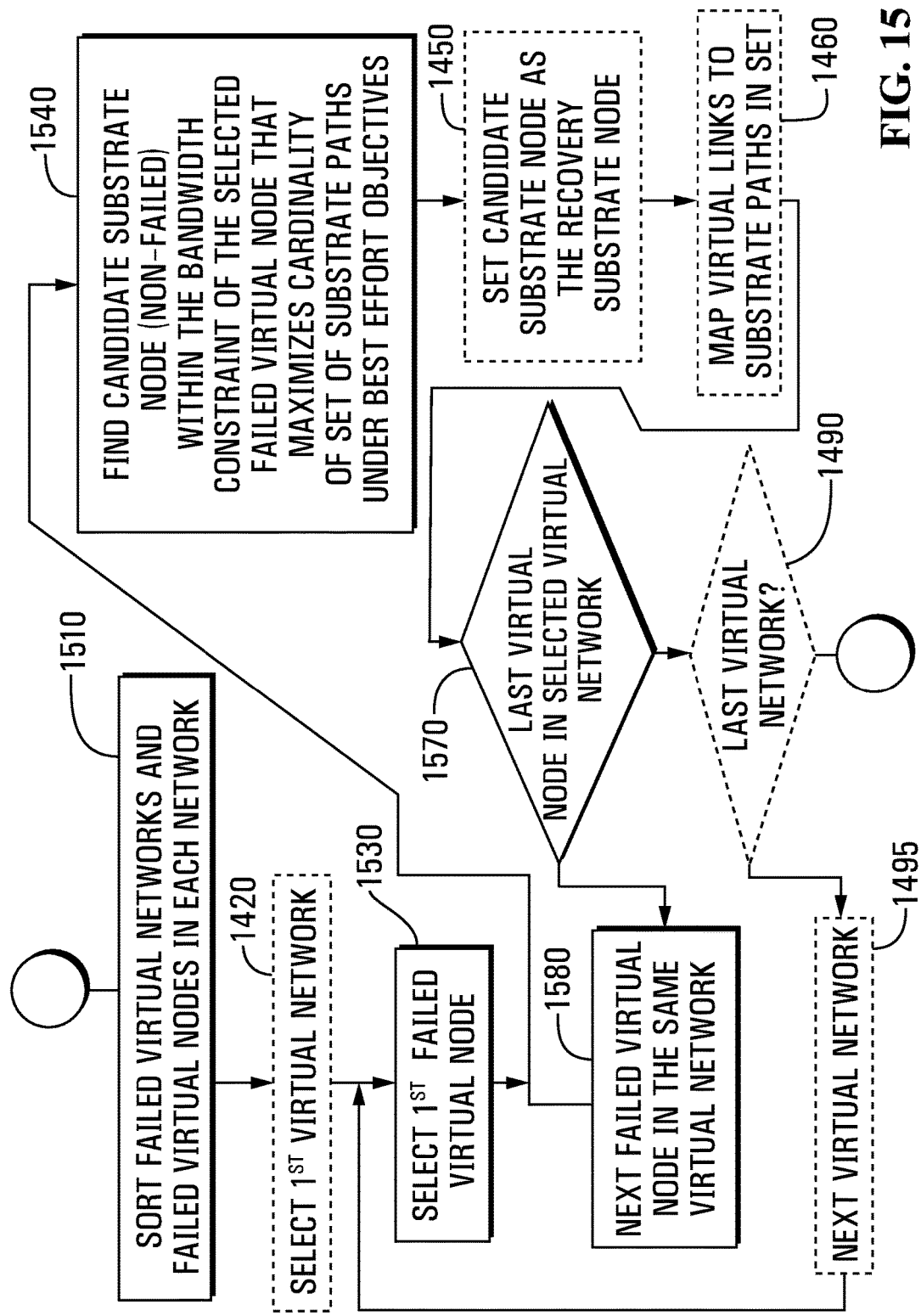
FIG. 15 is a flowchart illustrating a sequence of steps in another example non-limiting embodiment of an embedding function.

In an alternative embodiment, shown in FIG. 15, the heuristic re-embedding solution permits the recovery of virtual nodes and adjacent virtual links in the case of a multiple virtual node failure. In this case, the preliminary step (step 1510) may include sorting not only the failed virtual networks, but also the multiple failed virtual nodes within each failed virtual network. The sorting may be carried out based on the total lost bandwidth in the adjacent virtual links, in increasing order. For each failed virtual network, this results in a list which begins with failed virtual nodes whose adjacent virtual links have the lowest bandwidth requirements and ends with failed virtual nodes whose adjacent virtual links have the highest bandwidth requirements. In some embodiments, the sorting may be done from the universe of all failed virtual nodes irrespective of the virtual network they are derived from, whereas in other embodiments (such as could be implemented by the flowchart illustrated in FIG. 15), sorting may be done on a per-virtual network basis such that, for example, the total bandwidth requirement of the totality of the failed virtual links of each virtual network is tallied and this is used as a first sorting variable and then, within a particular virtual network, the failed virtual nodes are sorted according to increasing bandwidth requirement. Other ways of sorting the failed virtual nodes may be implemented, such as on the basis of a priority code, which could attribute different priorities to different virtual nodes or virtual networks based on attributes such as customer identity, link/node criticality, etc.

The embedding function of FIG. 15 proceeds to step 1420 as previously described and then at step 1530, a first failed virtual node in the selected failed virtual network is selected. At step 1540, similarly to step 1440, the embedding function proceeds over all candidate substrate nodes that are not failed to find the candidate node for which the set of substrate paths for the failed adjacent virtual links has maximum cardinality. (i.e., that allows the maximum number of failed adjacent virtual links to be mapped to substrate paths passing through that candidate substrate node). This is done for the first selected failed virtual node and each failed virtual node in the selected failed virtual network (steps 1570 and 1580).

It is recalled that if maximum cardinality of the set of substrate paths is achieved for two or more candidate substrate nodes, then the one that best satisfies certain best effort objectives is the "winner", i.e., is selected as the recovery substrate node. Various algorithms that apply the best effort objective are possible. In a first algorithm, denoted Algorithm A, the best effort objective is the shortest path/lowest cost. In a second specific example, denoted Algorithm B, the best effort objective is the maximum flow. Both specific examples of the best effort objective are now described.

Algorithm A: Best Effort Objective is Shortest Path/Lowest Cost

Figure 5:
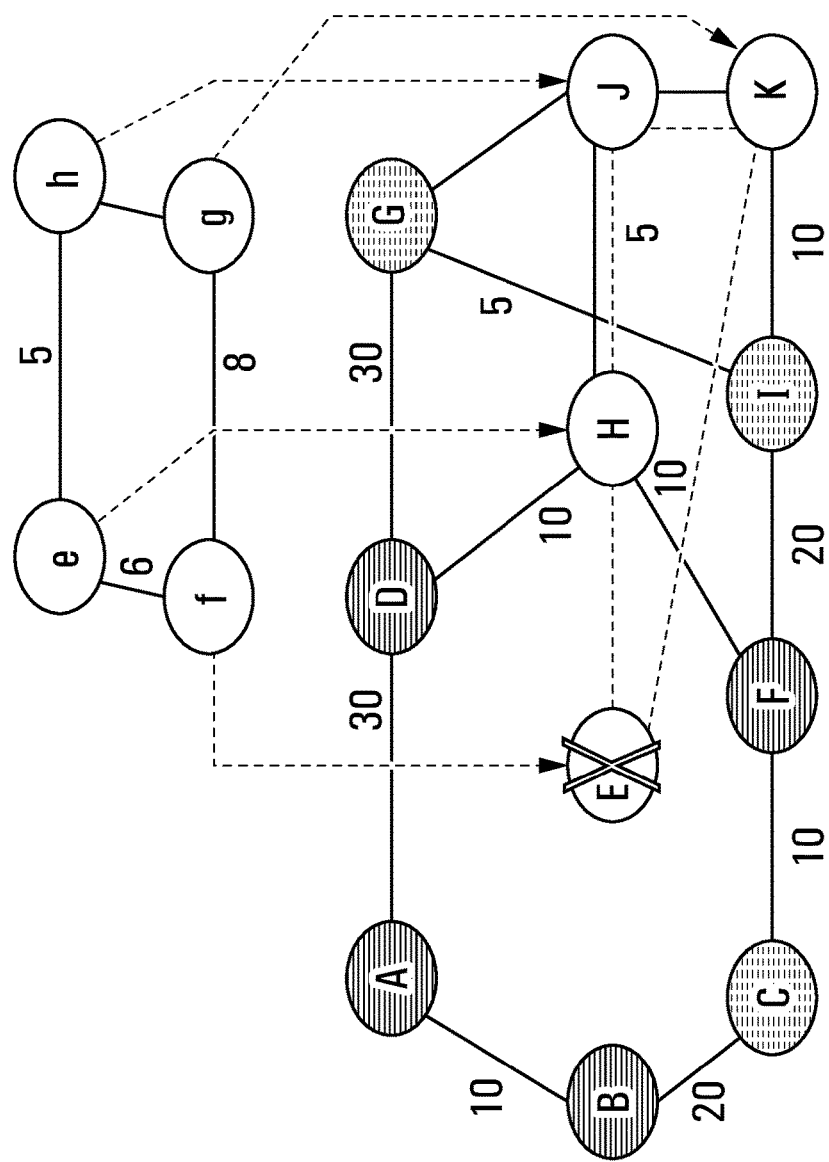
FIG. 5 illustrates failure of a particular substrate node in the substrate network of FIG. 1, which is a simplified version of FIG. 2.

An illustration of Algorithm A is now considered with reference to FIG. 5, which illustrates that substrate node E has failed. At the time of the failure, virtual node "f" had been mapped to substrate node "E" and therefore it is a failed virtual node, whereas virtual links (e, f) and (f, g) are failed adjacent virtual links. Virtual node "e" is mapped to substrate node "H" but does not require re-embedding. Consider that the embedding function is attempting to satisfy the best effort objective of a "shortest path" criterion, this would imply seeking the shortest path for each failed virtual link, while of course meeting bandwidth constraints such as each virtual link's bandwidth requirements and each substrate link's bandwidth capacity. In this example, remapping virtual link (e, f) means re-mapping virtual node "f" to substrate node C so as to achieve the "shortest path" for virtual link (f, e) without involving substrate node E. In other words, by re-mapping virtual node "f" to substrate node C, virtual link (f, e) is mapped to the substrate path between substrate nodes C and H via node F, i.e., substrate links (C, F) and (F, H). However, it is noted that with virtual node f now being mapped to substrate node C (the "recovery substrate node") instead of substrate node E, traffic from virtual node e (mapped to substrate node H) to virtual node g (mapped to substrate node K) via virtual node f (now re-mapped to substrate node C) must now flow twice over substrate link (C, F). This could lead to substrate link (C, F) being a bottleneck link (e.g., if its residual bandwidth drops to less than, say, 25% of bandwidth capacity, or equivalently, it is carrying greater than a certain threshold, say 75%, of its capacity). This is a manifestation of a generalized phenomenon, which is that when the substrate node and substrate links are selected based on minimum bandwidth cost criteria (e.g., shortest path), it may give rise to one or more bottleneck links. Bottleneck links reduce the probability of recovery of virtual links with greater bandwidth loss (namely virtual links towards the "end" of the sorted list created at Step 2-1). To this end, a different best-effort objective may be sought, as now described in Algorithm B.

Algorithm B: Best Effort Objective is Maximum Flow

Figure 6:
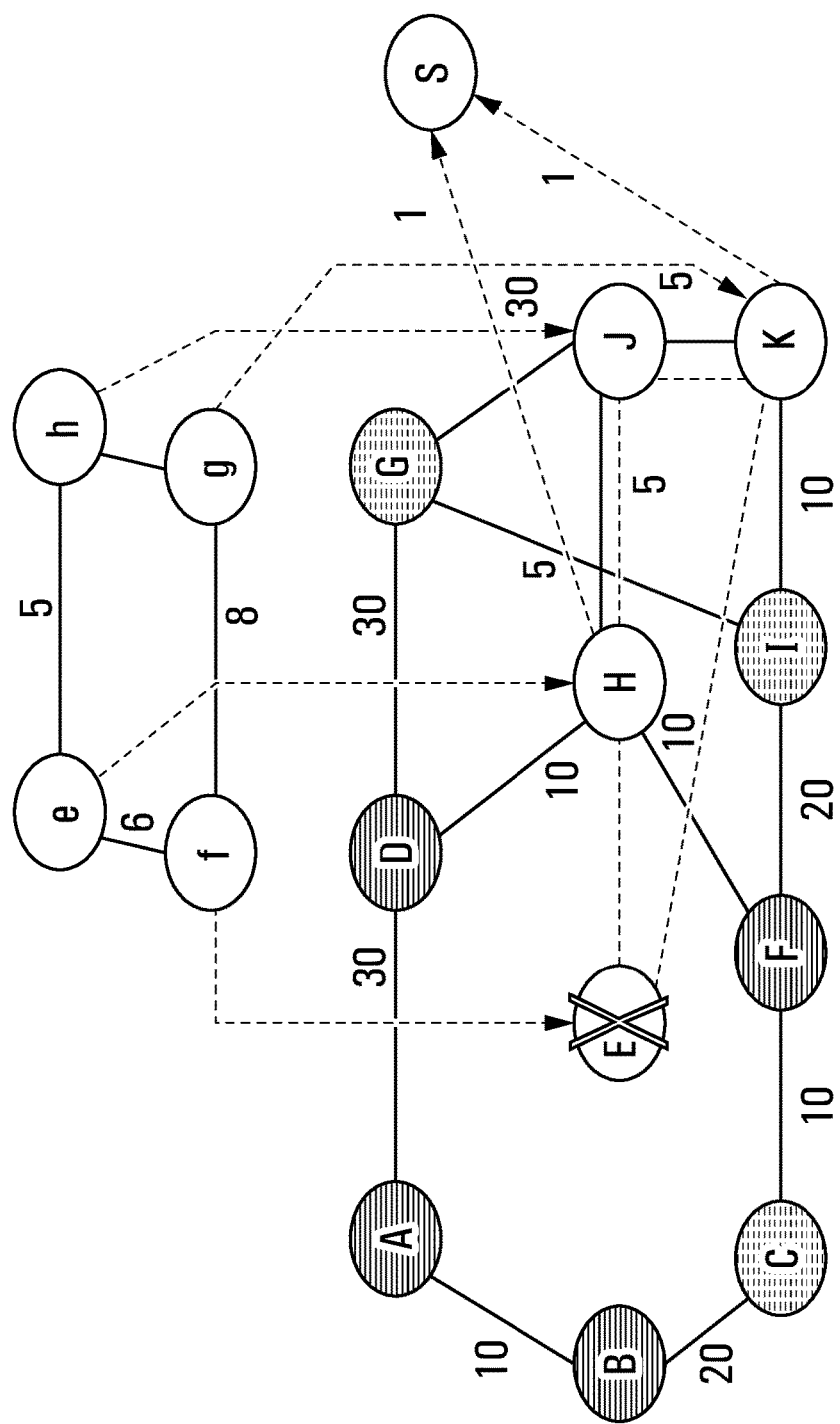
FIG. 6 shows augmenting the substrate network with a pseudo-sink substrate node (S) and pseudo-links.

Algorithm B permits the recovery of virtual nodes and adjacent virtual links that achieves bottleneck control by implementing what can be referred to as the Max Flow Approach. Algorithm B is similar to Algorithm A except that the best effort objective sought to be achieved by the embedding function is different. Generally speaking, Algorithm B determines the maximum flow from a source to sink avoiding bottleneck substrate links. For the purposes of illustration, it is assumed that unit flow is sent from a source to a sink. Maximum flow corresponds to the maximum number of paths between the source and sink without exceeding link capacity. The following steps may be performed as part of Algorithm B:

Step 1: With reference to FIG. 6, the substrate network is augmented with a pseudo-sink substrate node (S) and a pseudo-link is added from each substrate node (that hosts a virtual node) to the pseudo-sink substrate node S.

Figure 7:
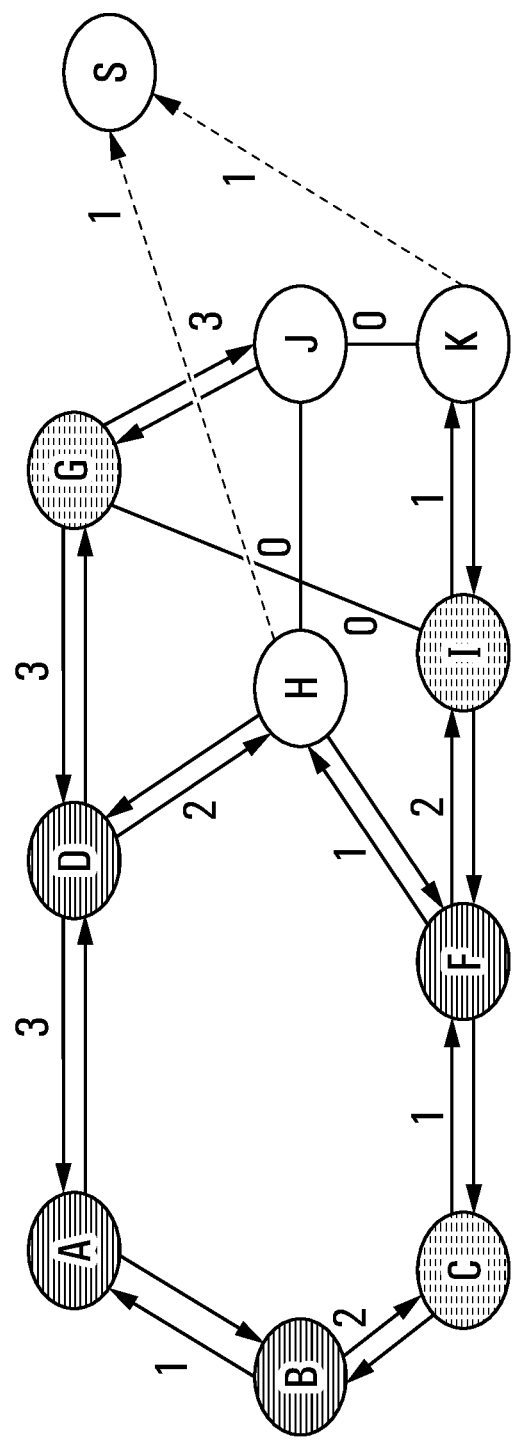
FIG. 7 shows replacement of bi-directional un-failed substrate links with two uni-directional substrate links in the augmented substrate network of FIG. 6.

Step 2: With reference to FIG. 7, each bi-directional un-failed substrate link is replaced with two uni-directional substrate links in the graph G.

Step 3: The capacities of the new substrate links are discretized according to an "estimation function":

$$\frac{r_{UV}}{\max_{\forall\{\overline{UV} \in \varepsilon_i^f\}} \{b_{iUV}\}}$$

Where $r_{UV}$ is the residual bandwidth of the corresponding substrate link (U, V). The above estimation function is inversely proportional to the maximum demand of all the failed virtual links of the virtual network. This stringent estimation ensures that each substrate link can carry a flow equal to the maximum bandwidth demand across all the virtual links. Other estimation functions such as minimum and average demand are possible although could result in oversubscription of bandwidth.

Step 4: Following the above, an algorithm such as the Edmonds-Karp algorithm (see Edmonds, Jack; Karp, Richard M. (1972). "Theoretical improvements in algorithmic efficiency for network flow problems". Journal of the ACM. Association for Computing Machinery. 19 (2): 248-264, hereby incorporated by reference herein) may be used to compute a set of augmenting paths from each candidate substrate node to pseudo-sink substrate node S so as to maximize the sum of flow. If a new path cancels the flow of a link assigned by an earlier path, the algorithm re-arranges both paths to exclude the link from the paths. The candidate substrate node yielding the maximum number of paths is selected as the substrate node that will be used to recover the failed virtual node.

Implementation of Algorithm B may yield the substrate paths that do not necessarily represent the shortest possible path between the substrate nodes to which two failed virtual nodes are re-mapped.

Solution for Re-Mapping Failed Independent Virtual Links

In the case of independent failed virtual links, this may be considered as a multi-commodity un-splittable flow problem. By applying the above Algorithm B to failed independent virtual links one may obtain invalid paths between pairs of substrate nodes, because a failed substrate node may be considered. Instead, one may propose an algorithm that implements a greedy strategy based on computing the minimum cost path (MCP). This algorithm sorts the failed independent virtual links in increasing order of their bandwidth requirement, resulting in an ordering of the independent virtual links. The algorithm then computes an alternate substrate path for each such failed independent virtual link, excluding failed substrate nodes and links. For a particular independent failed virtual link between two virtual nodes, the algorithm finds the minimum cost path between the two corresponding substrate nodes using the MCP procedure MCP. The MCP procedure uses a modified version of Dijkstra's shortest path algorithm (see Dijkstra, E. W., "A note on two problems in connexion with graphs", Numerische Mathematik. 1: 269-271, hereby incorporated by reference herein) to take into account substrate link residual capacity and virtual link demand while computing minimum cost path.

To demonstrate, consider the recovery of independent virtual links I(a;d) and I(b;c) of the virtual network VN1, as shown in FIG. 2. The algorithm should find alternate substrate paths between substrate nodes B and D for failed independent virtual link I(a;d) and between substrate nodes A and F for failed independent virtual link I(b;c). The max flow based heuristic may return substrate paths between substrate nodes B and A (or, between substrate nodes D and F), and is thus inappropriate. Hence, the greedy algorithm being described herein first recovers virtual link I(a;d) through the substrate path {I(B;A), I(A;D)} since I(a;d) has the lowest bandwidth demand. Finally, the algorithm computes the path {I(A;D), I(D;H), I(H;F)} to recover failed independent virtual link I(b;c)}.

Evaluation/Results

Evaluations of the aforementioned solutions were carried out using a server with two Intel Xeon E5-2560 (8 cores@2 GHz) with 256 GB RAM. The evaluations were done using both small-scale networks (~50 substrate nodes) and large-scale networks (~1000 substrate nodes). The bandwidth utilization of existing substrate links was between 20% and 75%. The bandwidth requirement of each virtual link was assumed to be about 10-15% of total capacity of the underlying substrate links.

Figure 8:
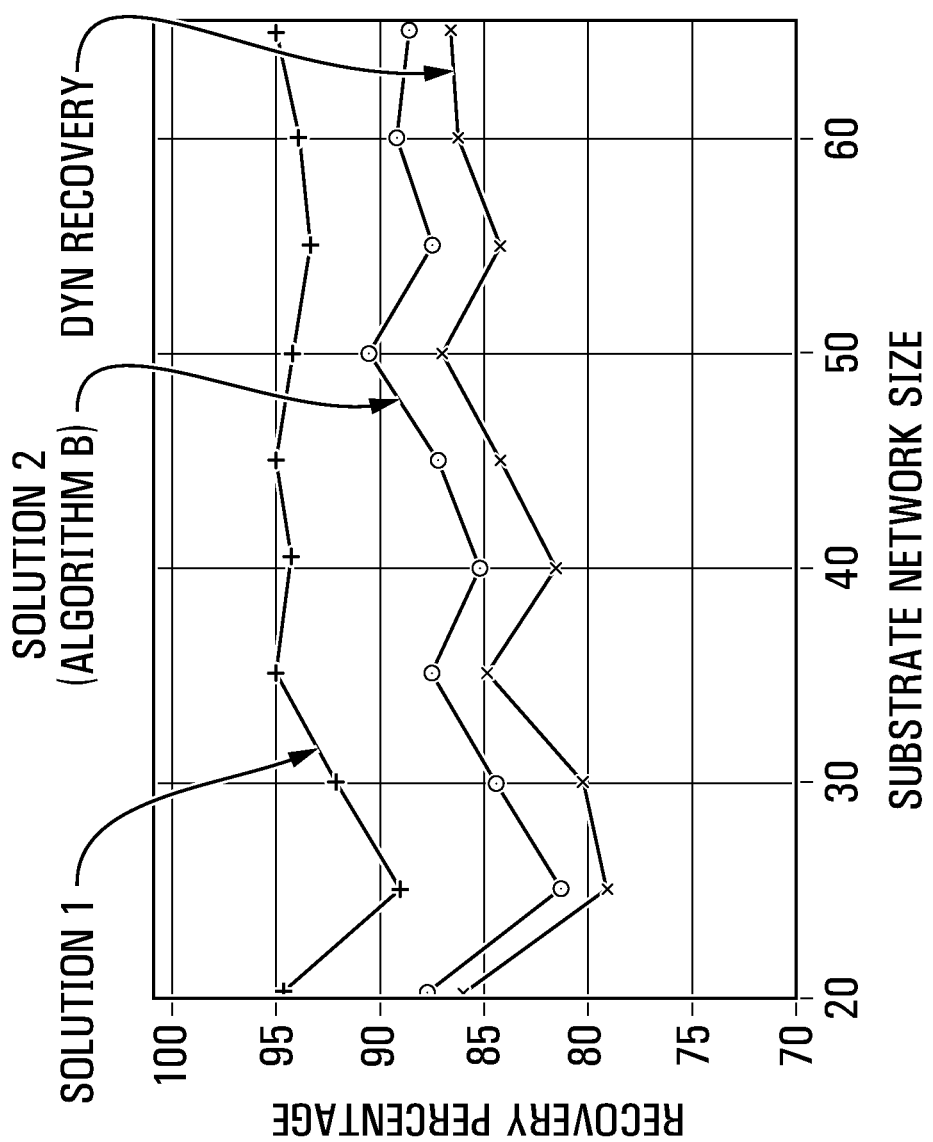
FIG. 8 shows a comparison of the fraction of recovered links, for various embedding functions.
Figure 9:
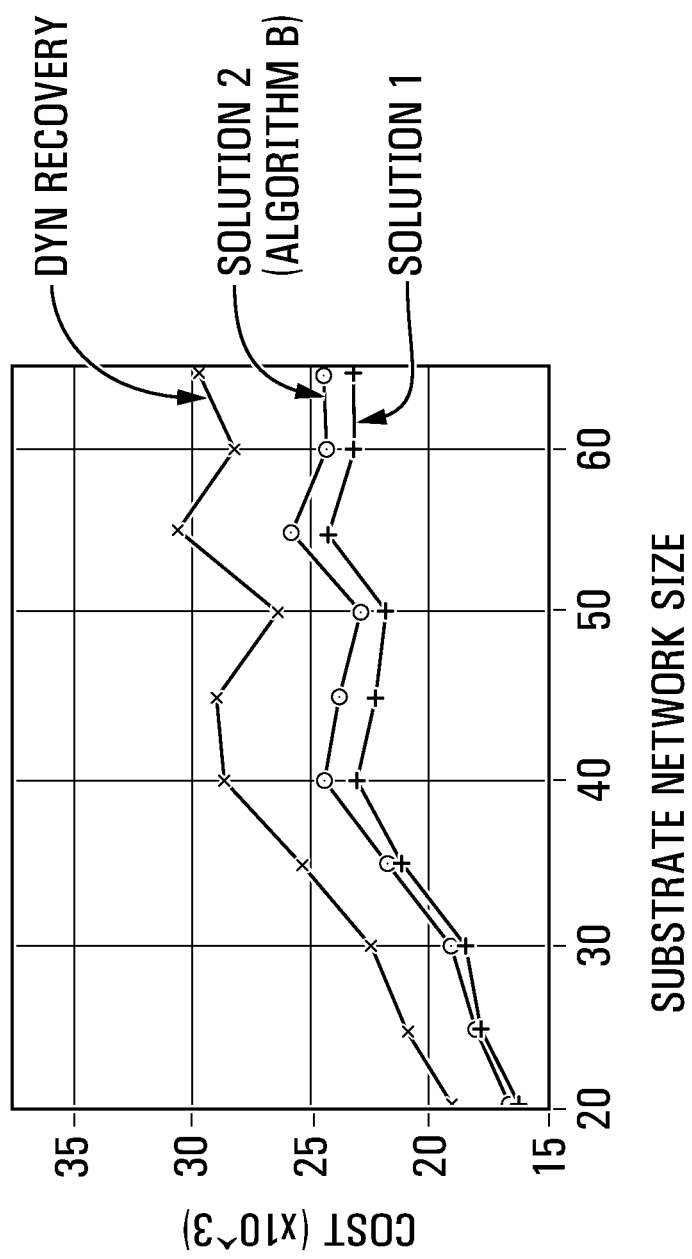
FIG. 9 shows a comparison of a cost function for various embedding functions.
Figure 10:
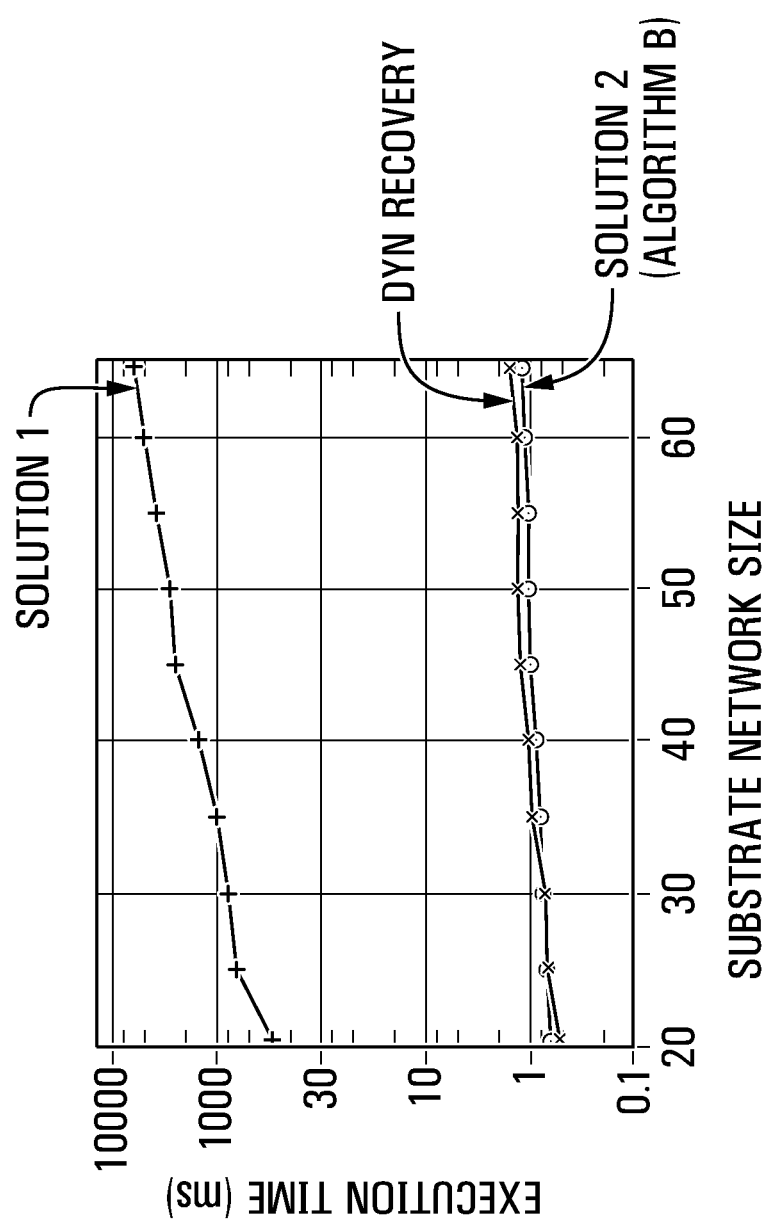
FIG. 10 shows a comparison of execution time for various embedding functions.

FIGS. 8-10 show a comparison for a small-scale network between Solution 1, Solution 2 (implementing Algorithm B) and Dyn Recovery (which is a known algorithm that re-embeds all failed virtual nodes and failed virtual links and may end up re-embedding the entire virtual network: see B. LU, H. Tao, S. Xiao-chuan, C. Jian-ya, and L. Yun-jie. "Dynamic Recovery for Survivable Virtual Network Embedding". The Journal of China Universities of Posts and Telecommunications, 21:77-84, June 2014, hereby incorporated by reference herein.). FIG. 8 pertains to the fraction of recovered links, showing that Solution 2 (implementing Algorithm B) is almost always able to re-embed within 10% of the optimal algorithm (the ILP-based approach discussed above) and outperforms the Dyn Recovery approach. FIG. 9 pertains to the cost of embedding, showing that the normalized cost of embedding for Solution 2 (implementing Algorithm B) is within 2-3% of Solution 1 (optimal ILP approach) and vastly outperforms the Dyn Recovery approach. FIG. 10 pertains to the execution time, showing that Solution 2 (implementing Algorithm B) is several orders of magnitude better than Solution 1 and is comparable to the Dyn Recovery approach when re-embedding of the entire virtual network is not done.

Figure 11:
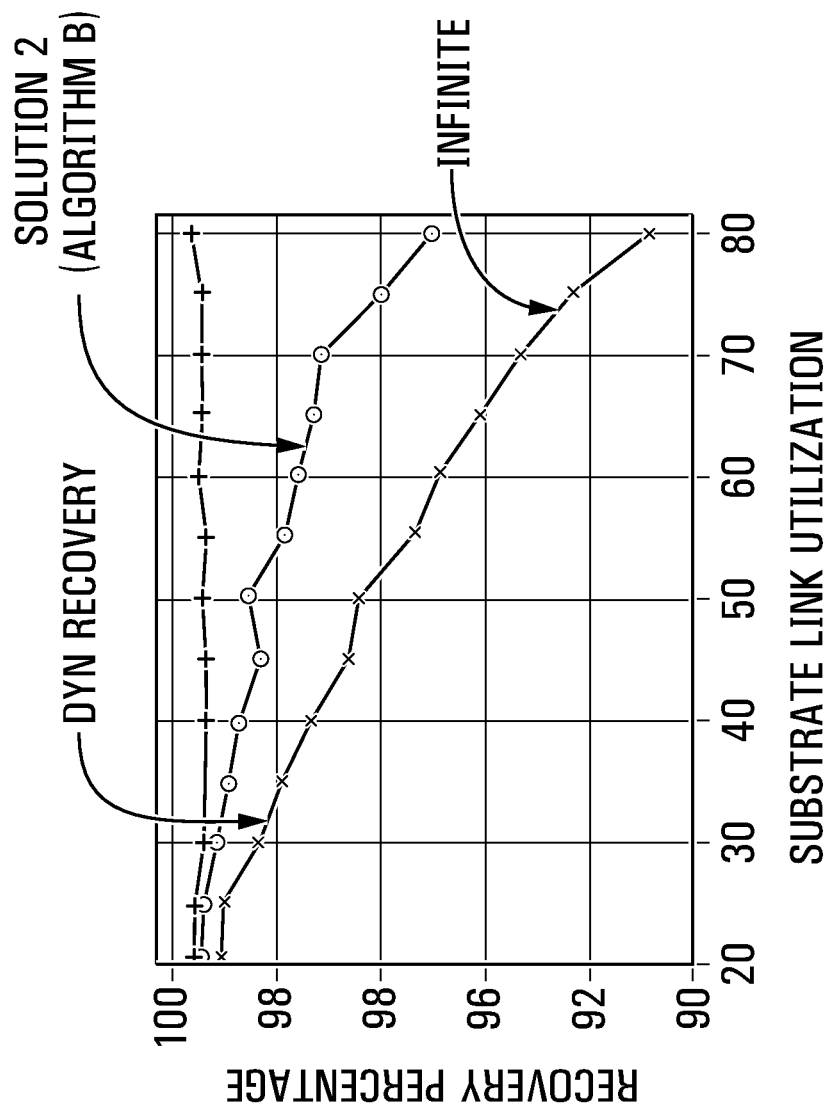
FIGS. 11-13 show a performance comparison for various embedding functions for a large-scale network.
Figure 12:
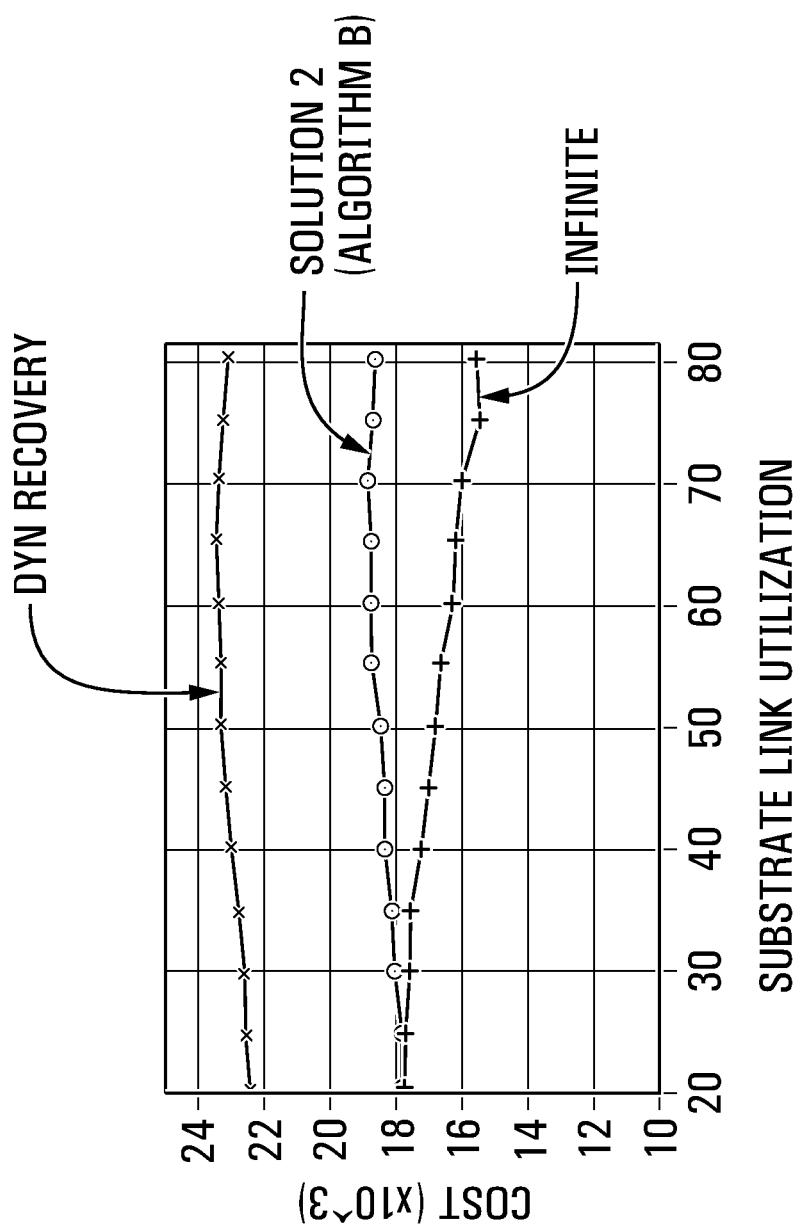
Figure 13:
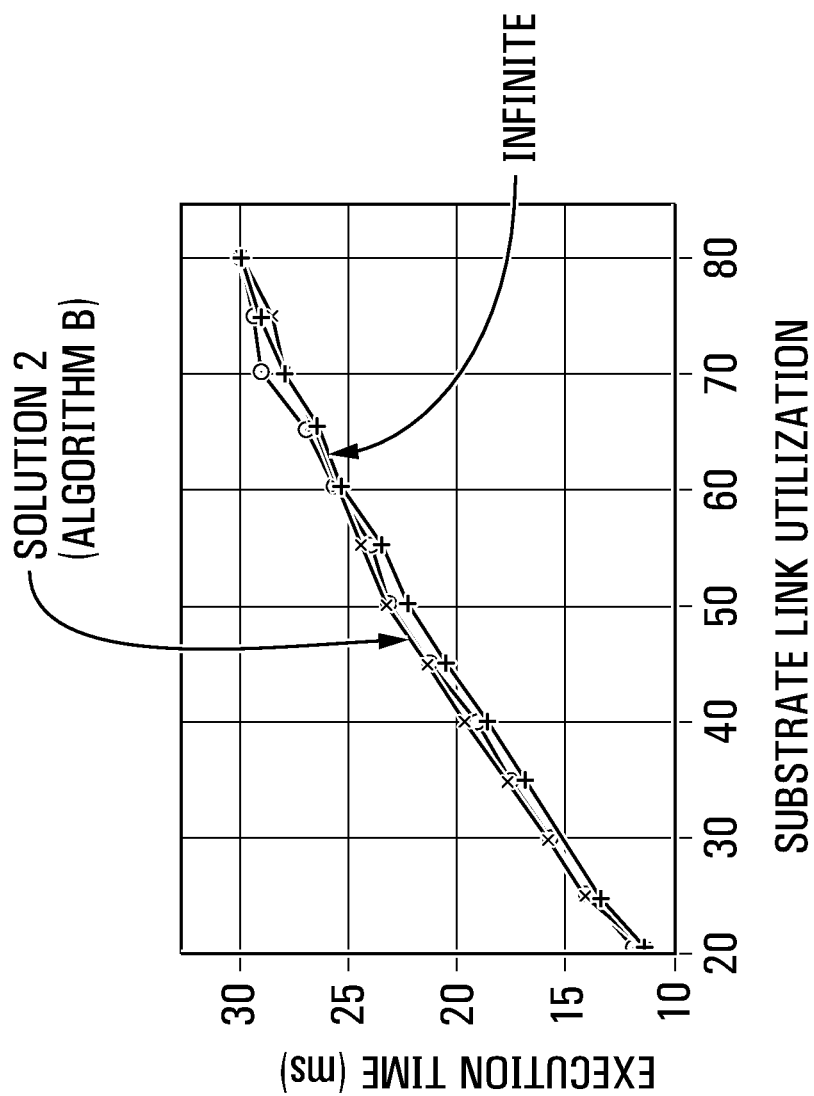

FIGS. 11-13 show a comparison for a large-scale network between Solution 2 (implementing Algorithm B), Dyn Recovery and a case denoted "infinite", which is a hypothetical case of Solution 2 where the substrate network has infinite bandwidth capacity. This algorithm is used as a benchmark rather than Solution 1, because for a large scale network, results cannot be obtained for Solution 1. FIG. 11 pertains to the fraction of recovered links, showing that Solution 2 (implementing Algorithm B) is able to re-embed within 5% of the infinite bandwidth case and has asymptotically improving performance compared to Dyn-Recovery. FIG. 12 pertains to the normalized cost of embedding, showing that for moderate-to-high substrate link utilization cases, Solution 2 (implementing Algorithm B) is within 2% of the infinite bandwidth case. FIG. 13 pertains to the execution time, showing that the execution times of all approaches are comparable.

As such, it has been shown that embodiments of the present invention may allow for recovery from substrate network failure (specifically one or more substrate node failures and possibly also one or more substrate link failures) through re-mapping of virtual nodes and virtual links such that one or more of the following objectives are met:

A number of failed links that are re-embedded is high with respect to existing solutions and/or maximized;

A cost of embedding, while meeting all other constraints, is low with respect to existing solutions and/or minimized;

A partial recovery of a virtual network is admitted as a solution with network agitation that is low with respect to existing solutions and/or minimized;

A number of bottleneck links after re-embedding of failed links is low with respect to existing solutions and/or minimized;

A cost of re-embedding failed independent virtual nodes is low with respect to existing solutions and/or minimized.

While the above description and diagrams have provided a description and illustration of several example embodiments, it should be appreciated that variations are possible while remaining within the scope of the invention. For example, certain elements that are expected to be known or common to a person of ordinary skill in the art have not been described, while certain features that have been described may be omitted in some embodiments and included in others. Those skilled in the art will of course appreciate that the invention is only to be limited by the claims attached hereto.

The invention claimed is:

1. A method for failure recovery in a virtual network environment including a plurality of embedded virtual networks each having virtual nodes and virtual links mapped onto substrate nodes and substrate paths, respectively, of a common substrate network, the method comprising, in response to failure of at least one of the substrate nodes, hereinafter a failed substrate node:

identifying those virtual networks, hereinafter failed virtual networks, of which one of the virtual nodes, hereinafter a failed virtual node, was previously mapped to the failed substrate node;

for a first one of the failed virtual networks:
  selecting one of a plurality of candidate nodes as a recovery substrate node for the failed virtual network based on a remapping objective, each of the candidate nodes comprising a different one of the substrate nodes other than the failed substrate node, the remapping objective comprising prioritizing maximizing the number of virtual links of the failed virtual network that are capable of being remapped to substrate paths adjacent the candidate substrate node ultimately selected as the recovery substrate node over minimizing a total cost of provisioning bandwidth for remapping the virtual links of the failed virtual network;
  remapping the failed virtual node of the failed virtual network to the recovery substrate node for the failed virtual network; and
  remapping the virtual links of the failed virtual network that are adjacent the failed virtual node of the failed virtual network to substrate paths adjacent the recovery substrate node for the failed virtual network; and
repeating the selecting, remapping and remapping for at least a second one of the failed virtual networks.

2. The method defined in claim 1, the method further comprising sorting the failed virtual networks into an ordered list, wherein the first one of the failed virtual networks comes before the second one of the failed virtual networks on the list.

3. The method defined in claim 2, wherein said sorting the failed virtual networks into an ordered list is carried out according to bandwidth lost in the virtual links of each failed virtual network that are adjacent the failed virtual node of said failed virtual network.

4. The method defined in claim 2, wherein as a result of the sorting, the bandwidth requirement of the virtual links of the first one of the failed virtual networks that are adjacent the failed virtual node of the first one of the failed virtual networks is lower than the bandwidth requirement of the virtual links of the next one of the failed virtual networks that are adjacent the failed virtual node of the next one of the failed virtual networks.

5. The method defined in claim 1, wherein a given virtual link adjacent the failed virtual node of the failed virtual network is deemed capable of being remapped to a given substrate path adjacent the candidate substrate node if the given substrate path has sufficient available bandwidth to satisfy a bandwidth requirement of the given virtual link.

6. The method defined in claim 5, wherein in the event that for each of two or more candidate substrate nodes, the number of virtual links adjacent the failed virtual node of the failed virtual network that are capable of being remapped to a substrate path adjacent the candidate substrate node is the greatest, the method comprises selecting, as the recovery substrate node, one of the two or more candidate substrate nodes for which a best effort objective is satisfied.

7. The method defined in claim 6, wherein the best effort objective is a shortest path or lowest cost objective.

8. The method defined in claim 6, wherein the best effort objective is a maximum flow objective.

9. A method for failure recovery in a virtual network environment including a virtual network having virtual nodes and virtual links mapped onto substrate nodes and substrate paths, respectively, of a substrate network, the method comprising, in response to failure of a plurality of the substrate nodes, hereinafter failed substrate nodes:
  identifying those virtual nodes, hereinafter failed virtual nodes, that are mapped to the failed substrate nodes;
  sorting the failed virtual nodes into an ordered list;
  for a first one of the failed virtual nodes on the list:
    selecting one of the substrate nodes other than the failed substrate nodes as a recovery substrate node for the failed virtual node based on a remapping objective;
    selecting one of a plurality of candidate nodes as a recovery substrate node for the failed virtual node based on a remapping objective; each of the candidate nodes comprising a different one of the substrate nodes other than the failed substrate node, the remapping objective comprising prioritizing maximizing the number of virtual links adjacent the failed virtual node that are capable of being remapped to substrate paths adjacent the candidate substrate node ultimately selected as the recovery substrate node over minimizing a total cost of provisioning bandwidth for remapping the virtual links adjacent the failed virtual node;
    remapping the failed virtual node to the recovery substrate node for the failed virtual node; and
    remapping the virtual links that are adjacent the failed virtual node to substrate paths adjacent the recovery substrate node for the failed virtual node; and
  repeating the selecting, remapping and remapping for at least a second one of the failed virtual nodes on the list.

10. The method defined in claim 9, wherein the failed virtual nodes appear on the list in order of increasing bandwidth requirement, the second one of the failed virtual nodes having a greater bandwidth requirement than the first one of the failed virtual nodes.

11. The method defined in claim 9, wherein the failed virtual nodes appear on the list in order of decreasing priority, the second one of the failed virtual nodes having a lower priority than the first one of the failed virtual nodes.

12. The method defined in claim 9, wherein as a result of the sorting, the bandwidth requirement of the virtual links that are adjacent the first one of the failed virtual nodes is lower than the bandwidth requirement of the virtual links of the next one of the failed virtual nodes.

13. The method defined in claim 9, wherein a given virtual link adjacent the failed virtual node is deemed capable of being remapped to a given substrate path adjacent the candidate substrate node if the given substrate path has sufficient available bandwidth to satisfy a bandwidth requirement of the given virtual link.

14. The method defined in claim 13, wherein in the event that for each of two or more candidate substrate nodes, the number of virtual links adjacent the failed virtual node that are capable of being remapped to a substrate path adjacent the candidate substrate node is the greatest, the method comprises selecting, as the recovery substrate node, one of the two or more candidate substrate nodes for which a best effort objective is satisfied.

15. The method defined in claim 14, wherein the best effort objective is a shortest path or lowest cost objective.

16. The method defined in claim 14, wherein the best effort objective is a maximum flow objective.

17. The method defined in claim 9, further comprising repeating the identifying, mapping and mapping for all of the failed virtual nodes in the virtual network.

18. A system for failure recovery in a virtual network environment including a plurality of virtual networks each having virtual nodes and virtual links mapped onto substrate nodes and substrate paths, respectively, of a common substrate network, the system comprising:

a processing unit for executing instructions; and a memory unit for storing instructions which, when executed by the processing unit, configure the system to respond to failure of at least one of the substrate nodes, hereinafter a failed substrate node, by:

identifying those virtual networks, hereinafter failed virtual networks, of which one of the virtual nodes, hereinafter a failed virtual node, was previously mapped to the failed substrate node;

for a first one of the failed virtual networks:

selecting one of a plurality of candidate nodes as a recovery substrate node for the failed virtual network based on a remapping objective, each of the candidate nodes comprising a different one of the substrate nodes other than the failed substrate node, the remapping objective comprising prioritizing maximizing the number of virtual links of the failed virtual network that are capable of being remapped to substrate paths adjacent the candidate substrate node ultimately selected as the recovery substrate node over minimizing a total cost of provisioning bandwidth for remapping the virtual links of the failed virtual network;

remapping the failed virtual node of the failed virtual network to the recovery substrate node for the failed virtual network; and remapping the virtual links of the failed virtual network that are adjacent the failed virtual node of the failed virtual network to substrate paths adjacent the recovery substrate node for the failed virtual network; and repeating the selecting, remapping and remapping for at least a second one of the failed virtual networks.

19. A system for failure recovery in a virtual network environment including a virtual network having virtual nodes and virtual links mapped onto substrate nodes and substrate paths, respectively, of a substrate network, the system comprising:

a processing unit for executing instructions; and a memory unit for storing instructions which, when executed by the processing unit, configure the system to respond to failure of a plurality of the substrate nodes, hereinafter failed substrate nodes, by:

identifying those virtual nodes, hereinafter failed virtual nodes, that are mapped to the failed substrate nodes;

sorting the failed virtual nodes into an ordered list;

for a first one of the failed virtual nodes on the list:

selecting one of the substrate nodes other than the failed substrate nodes as a recovery substrate node for the failed virtual node based on a remapping objective;

selecting one of a plurality of candidate nodes as a recovery substrate node for the failed virtual node based on a remapping objective; each of the candidate nodes comprising a different one of the substrate nodes other than the failed substrate node, the remapping objective comprising prioritizing maximizing the number of virtual links adjacent the failed virtual node that are capable of being remapped to substrate paths adjacent the candidate substrate node ultimately selected as the recovery substrate node over minimizing a total cost of provisioning bandwidth for remapping the virtual links adjacent the failed virtual node;

remapping the failed virtual node to the recovery substrate node for the failed virtual node; and remapping the virtual links that are adjacent the failed virtual node to substrate paths adjacent the recovery substrate node for the failed virtual node; and repeating the selecting, remapping and remapping for at least a second one of the failed virtual nodes on the list.

\* \* \* \* \*